United States Patent [19]
Kazama et al.

[11] Patent Number: 5,234,606
[45] Date of Patent: Aug. 10, 1993

[54] METHOD AND SYSTEM FOR RECOVERING WASTEWATER

[75] Inventors: Masahiro Kazama; Masahiro Sano; Seiji Takayama, all of Tokyo, Japan

[73] Assignee: NEC Environment Engineering Ltd., Tokyo, Japan

[21] Appl. No.: 771,973

[22] Filed: Oct. 9, 1991

[51] Int. Cl.⁵ .......................... C02F 1/32; C02F 9/00; C02F 1/72
[52] U.S. Cl. ...................... 210/748; 210/759; 210/760; 210/764; 210/766; 210/757; 210/908; 422/24; 422/30
[58] Field of Search ............... 210/748, 758, 759, 760, 210/764, 908, 909, 806, 743, 742, 757, 766; 422/22, 28, 24, 30

[56] References Cited

U.S. PATENT DOCUMENTS

| | | | |
|---|---|---|---|
| 3,660,277 | 5/1972 | McNhirtor | 210/760 |
| 3,772,188 | 11/1973 | Edwards | 210/760 |
| 3,870,033 | 3/1975 | Faylor | 210/900 |
| 4,012,321 | 3/1977 | Koubek | 210/748 |
| 4,218,315 | 8/1980 | Hartkorn | 210/748 |
| 4,280,912 | 7/1981 | Berry | 210/662 |
| 4,548,716 | 10/1985 | Boeve | 210/760 |
| 4,563,286 | 1/1986 | Johnson | 210/721 |
| 4,849,114 | 7/1989 | Zeff | 210/748 |
| 4,913,827 | 4/1990 | Nebel | 210/764 |
| 5,043,080 | 8/1991 | Cater | 210/748 |
| 5,180,499 | 1/1993 | Hinson | 210/748 |

FOREIGN PATENT DOCUMENTS 14312 11/1990 PCT Int'l Appl. .................. 210/748

OTHER PUBLICATIONS

Chemical Engineering Magazine Jan. 1982, "Ultraviolet Light Takes on CPI Role" by Legan.

Primary Examiner—Thomas M. Lithgow
Attorney, Agent, or Firm—Kanesaka and Takeuchi

[57] ABSTRACT

Raw water such as polluted ground water can be recovered to clean water through the following processes. Firstly, oxidizing agent is added to raw water to disinfect bacteria, and then after suspended solid is removed from the water, ultraviolet rays are irradiated on the water so that organic chlorine compounds can be decomposed by active oxygen generated by the irradiation of ultraviolet rays. Finally, the residual oxidizing agent remaining in the treated water is reduced by activated carbon and catalytic resin. Further, the organic chlorine compound decomposition reaction is promoted at pH of 9 or below and in a temperature range of 15 to 30° C.

6 Claims, 5 Drawing Sheets

METHOD AND SYSTEM FOR RECOVERING WASTEWATER

BACKGROUND OF THE INVENTION

1. Field of the Invention

The invention relates to the method and system for recovering polluted water, especially for treating ground water and industrial wastewater polluted by organic chlorine compounds.

2. Description of the Prior Art

In case ground water is used as industrial water, etc., it can not be used without being treated if it is polluted. Although there are many causes of polluting ground water, recently pollution of ground water with organic chlorine compounds due to percolation of industrial wastewater into soil is often reported.

As conventional methods for treating organic chlorine compounds e.g. trichloroethylene, tetrachloroethylene and 1,1,1-trichloroethane, contained in ground water, etc., there are evapotranspiration-adsorption process (combination of heated aeration and activated carbon adsorption) and oxidation decomposition process in which potassium permanganate and Fenton's reagent are added into the water. But the most commonly employed method in these days is the evapotranspiration-adsorption process which is a combined method of heated aeration and activated carbon adsorption.

However, in heated aeration and activated carbon adsorption methods, which form the evapotranspiration-adsorption process, activated carbon gets wet due to water vapor generated in the aeration, resulting in considerable capacity reduction of activated carbon for adsorbing organic chlorine compounds. As a result, an amount of the compounds, which are not adsorbed by activated carbon and thus released into the atmosphere, will increase. The released compounds will percolate again into soil. Also, since the saturated activated carbon must be disposed of, an extra cost for disposing the activated carbon is required. In addition, there are other problems including clogging of piping, heat exchanger and diffuser pipe caused by propagation of bacteria in the section where ground water is transferred, heated and aerated. On the other hand, in the oxidation decomposition process using potassium permanganate and Fenton's reagent, etc., consumption of reagent is large, and after-treatment of the treated water is required because the pollutant load is increased due to the use of the reagent and also because heavy metals are contained in the reagent.

OBJECT AND SUMMARY OF THE INVENTION

An object of the invention is to provide the method for effectively recovering polluted water, especially polluted ground water and industrial wastewater.

Another object of the invention is to provide the method for recovering water polluted by organic chlorine compounds.

A further object of the invention is to provide the method for recovering polluted water by effectively removing bacteria, suspended solid and organic chlorine compounds from water.

A still further object of the invention is to provide the method for recovering polluted water only by addition of oxidizing agent into polluted water followed by ultraviolet rays irradiation and also by reduction of residual oxidizing agent as after-treatment.

A still further object of the invention is to provide the method for recovering polluted water by adequately controlling pH and temperature of raw water.

A still further object of the invention is to provide the system for implementing the methods mentioned above.

Further objects and advantages of the invention will be apparent from the following description of the invention.

Recovery of polluted water based on the invention is achieved by carrying out disinfection, removal of suspended solid, decomposition of organic chlorine compounds and treatment of residual oxidizing agent in its order. In addition, after the removal of suspended solid, pH and temperature of raw water is adjusted prior to decomposition of organic chlorine compounds. The system for carrying out the above-mentioned processes is formed of a disinfection unit, a filter, an UV-oxidation-decomposition unit and a reduction unit, and also pH and temperature adjustment units are used, as required.

DETAILED DESCRIPTION OF PREFERRED EMBODIMENT

Figure 1:
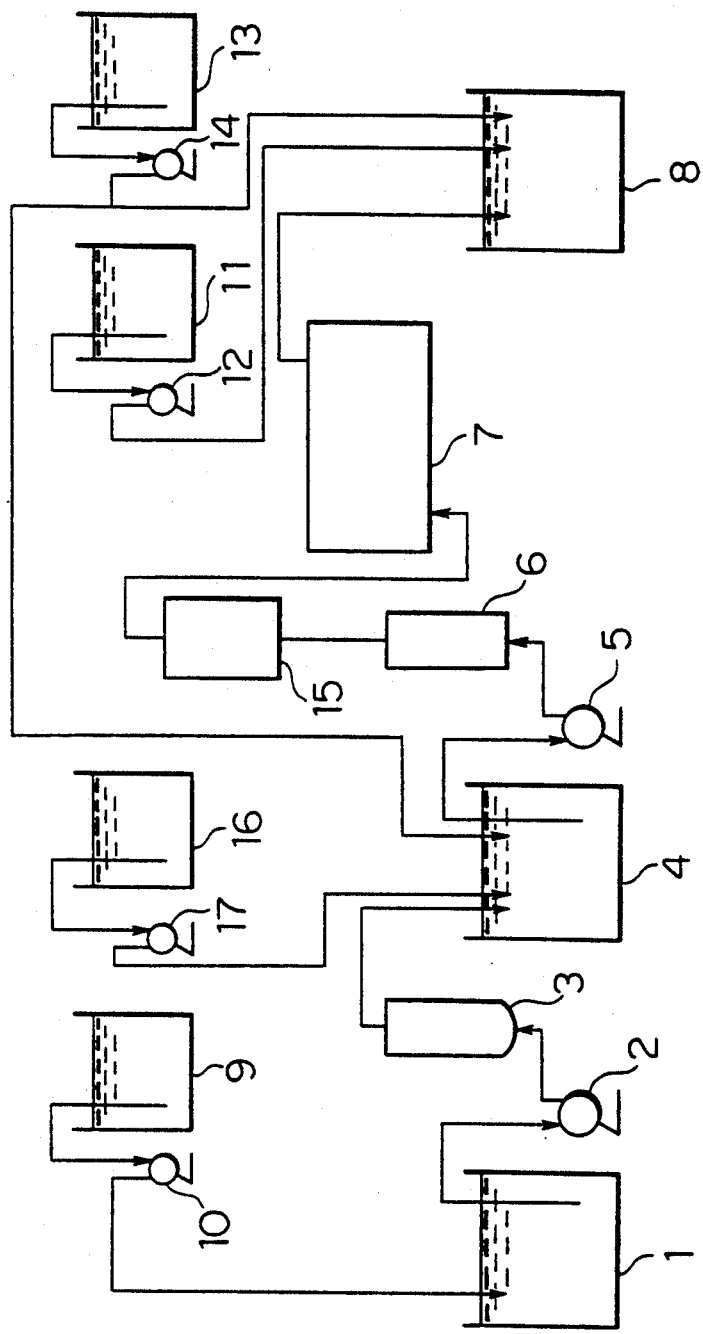
FIG. 1 shows a system based on the invention.

The first process, conducted in accordance with the invention, is a disinfection process. In the process, bacteria, which propagates due to various organic materials contained in polluted ground water, etc., is disinfected by oxidizing agent such as hydrogen peroxide and ozone. As a result of this, clogging of flowmeter, filter and piping used in the treatment system can be prevented. Oxidizing agents used in this process are not necessarily limited to special types, but should preferably satisfy such requirements as strong bactericidal action, high ultraviolet rays absorption capacity, easy after-treatment and having no corrosiveness on piping. Ozone is almost insoluble in water and thus inefficient in disinfection. Further, ozone, which has not been dissolved in water, causes offensive smell. By contrast, hydrogen peroxide can be easily handled, and residual hydrogen peroxide in water can be easily decomposed into water and oxygen by using ultraviolet rays, reducing agent and activated carbon. As to the amount of oxidizing agent to be added to the water, it is determined by taking into account both the disinfection effect and the amount required for decomposing organic materials conducted in the organic chlorine compound decomposing process in the 5th process.

In the 2nd process, suspended material is removed from the water by either filtration or sedimentation.

In the 3rd process, pH of the water treated in the 1st and 2nd processes is adjusted to 9 or below—preferably between 3 and 9.

In the 4th process, temperature of the water treated in the 3rd process is adjusted to fall within a range of 15° to 30° C.

The 3rd and 4th processes are the precesses required depending upon the condition of the water. Therefore, if the water satisfies the above-mentioned requirements, they are not necessary.

In the 5th process, organic chlorine compounds are oxidation-decomposed by irradiating ultraviolet rays on residual oxidizing agent remaining in the water treated in the 1st, 2nd, 3rd and 4th processes. In the oxidation decomposition reaction, the organic chlorine compounds are oxidation-decomposed by active oxygen generated by irradiating ultraviolet rays on the residual oxidizing agent. As a result of the oxidation-decomposition reaction, water, carbon dioxide and trace hydrochloric acid are generated. If necessary, the hydrochloric acid is then adsorbed by weak ion exchange resin. As UV lamp, either high pressure or low pressure mercury lamps may be used, but if hydrogen peroxide is used as oxidizing agent, a low pressure mercury lamp is advantageous because it irradiates ultraviolet rays with a main wave length of 253.7 nm which can efficiently decompose the oxidizing agent.

In the 6th process, the residual oxidizing agent carried over from the 5th process is reduced by using reducing agent, activated carbon or catalyst resin. For example, in case of hydrogen peroxide, it is reduced to oxygen and water. While, in case of ozone, it is reduced to oxygen.

Further, in the 5th process, when an organic chlorine compound is oxidation-decomposed, hydrochloric acid is formed. Especially, in case the concentration of the compound is high, pH of the water will drop considerably. In this case, the oxidation decomposition is carried out by adjusting pH of the water by adding alkali to the water in the 5th process or between the 5th and 6th processes. As alkali to be used for this purpose, any alkali among potassium hydroxide, calcium hydroxide, sodium hydroxide and sodium carbonate may be used. However, sodium hydroxide can be most easily handled in operation.

Compared with the conventional methods, in the treatment method based on the invention, organic chlorine compounds in polluted water can be easily treated, and also propagation of bacteria, which results in the clogging of piping can be avoided.

Moreover, the UV-oxidation-decomposition can be effectively carried out by adjusting both pH and temperature of water to 9 or below and to a range of 15° to 30° C. respectively prior to the UV-oxidation-decomposition process in the fifth process.

EXAMPLE

The examples of the invention are explained herein through the treatment tests of the wastewater containing trichloroethylene. The treatment tests were performed using the test equipment depicted in FIG. 1. Table 1 indicates the specification for the equipment.

TABLE 1

| | Specification of test equipment | |
|---|---|---|
| Process | Unit | Specification |
| 1st | Disinfection | 30% hydrogen peroxide |
| 2nd | Filtration | 10μ cartridge filter |
| 3rd | pH adjusting | 2% sodium hydroxide |
| | | 10% sulfuric acid |
| 4th | Temp. adjusting | Heat exchanger |
| 5th | UV oxidation | Capacity: 3.2 liters |

TABLE 1-continued

| | Specification of test equipment | |
|---|---|---|
| Process | Unit | Specification |
| | degradation | Material: Stainless steel |
| | | Jacket material: Quartz |
| | | Type of lamp: Low pressure mercury lamp |
| | | Capacity: 30W |
| 6th | Reduction | 10% sodium hydrogen sulfite |
| | pH adjustment | 2% sodium hydroxide |

Guaranteed reagent of trichloroethylene was initially dissolved in pure water in a measuring flask and put into tank 1, and then diluted with pure water until the volume of the diluted solution reaches 20 liters. The solution had a trichloroethylene concentration ranging from 5.0 to 0.05 mg/l and had 100 pcs/ml of live microorganism, and was used as a test solution.

Using pump 2, the test solution was passed through cartridge filter 3 and stored in tank 4. At the same time, hydrogen peroxide was supplied from hydrogen peroxide storage tank 9 to tank 1 by pump 10. The hydrogen peroxide concentration in tank 4 was adjusted to approx. 300 mg/l.

Figure 2:
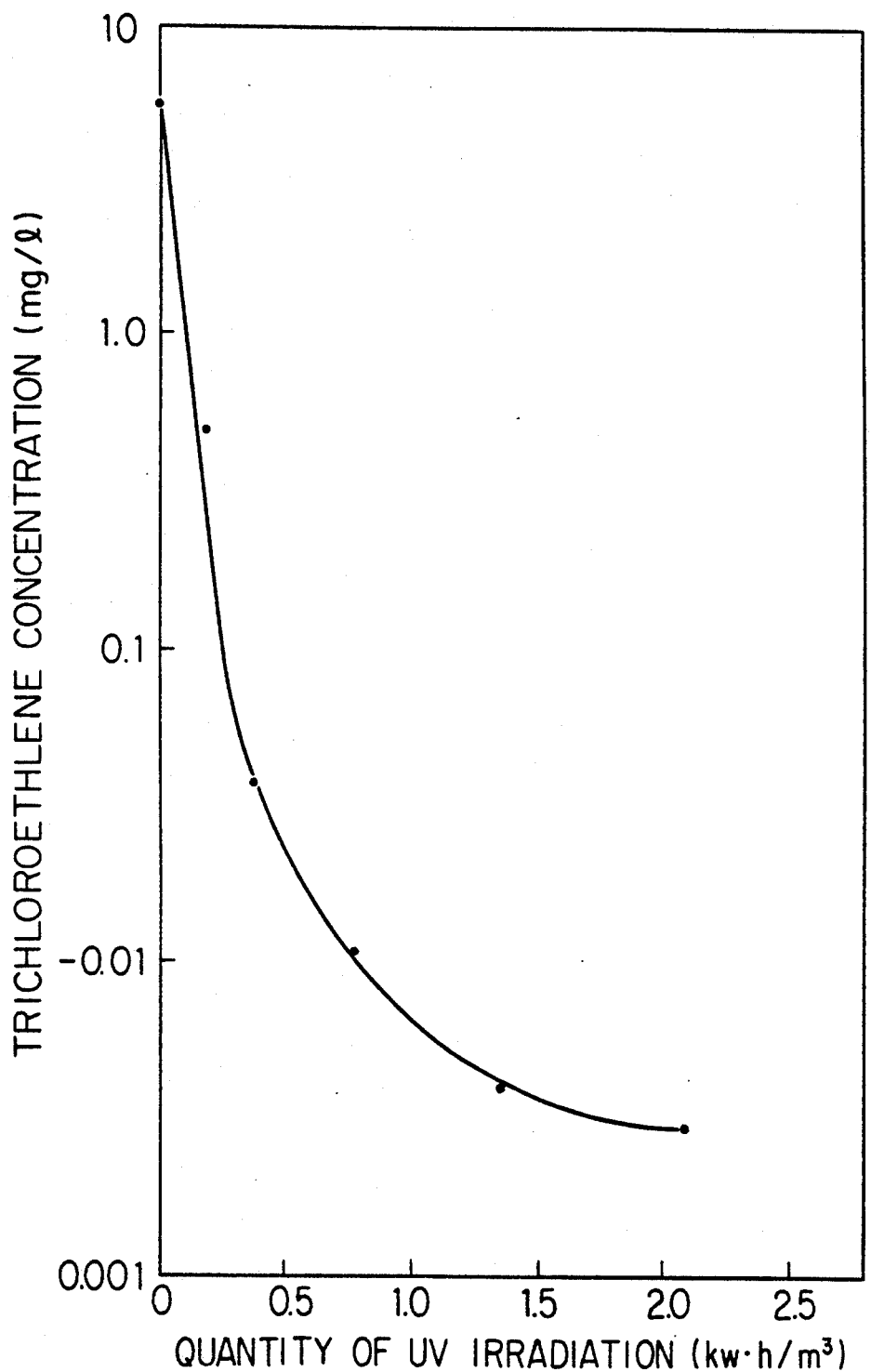
FIGS. 2 and 3 indicate relation between trichloroethylene concentration and ultraviolet rays irradiation amount.
Figure 3:
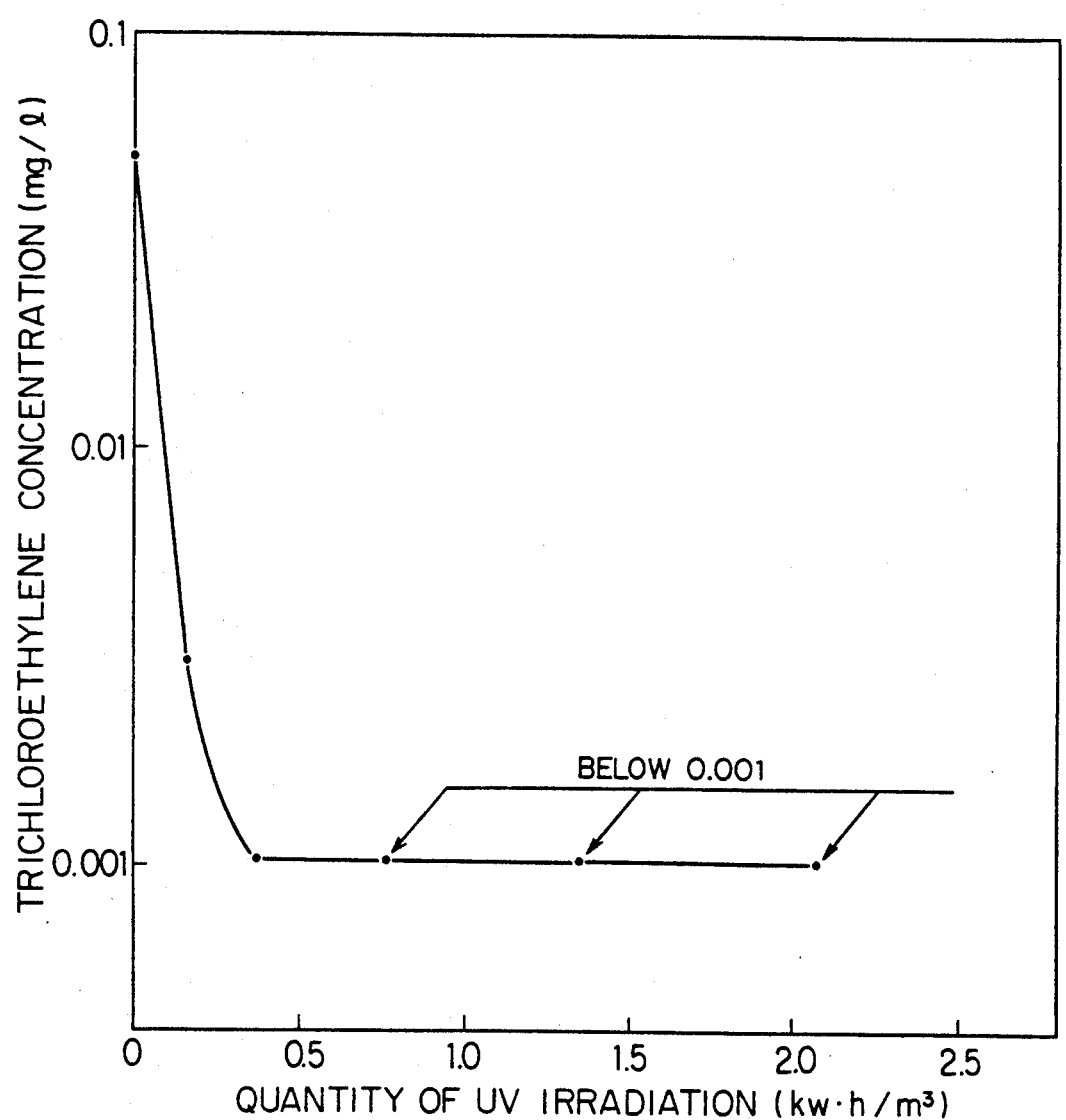

The hydrogen peroxide-containing test solution stored in tank 4 was transferred by pump 5, via flowmeter 6 and heat exchanger 15, to UV-oxidation-decomposition unit 7 where trichloroethylene is oxidation-decomposed. FIGS. 2 and 3 show the measurement results for trichloroethylene at initial concentrations of 5.0 mg/l and 0.05 mg/l respectively.

In either of both tests, residual hydrogen peroxide in the test solution was reduced by sodium hydrogen sulfite which had been supplied from sodium hydrogen sulfite storage tank 11 to tank 8 by pump 12. At the same time, sodium hydroxide was supplied to tank 8 to adjust pH of the test solution lowered due to the oxidation decomposition. Sodium hydroxide was supplied from sodium hydroxide storage tank 13 to tank 8 by pump 14.

As to disinfection which is one of the effects expected by applying the invention, the disinfection effect by hydrogen peroxide could be confirmed from the measurement results (0 pc/ml) of live microorganism in the test solution sampled from tank 4. In addition to the above mentioned tests carried out with hydrogen peroxide concentration adjusted to 300 mg/l, the same tests were conducted with hydrogen peroxide concentration adjusted to 1000 mg/l, 500 mg/l and 100 mg/l, and no live microorganism was found in any of the four test results.

The results of the trichloroethylene decomposition tests were shown in FIGS. 2 and 3. The target value of the trichloroethylene concentration in the treated water was set at 0.03 mg/l or less which is the provisional standard value for city water (established by the Ministry of Health and Welfare of Japan on Feb. 18, 1984). FIG. 2 shows the change of trichloroethylene concentration in the water with respect to the quantity of UV irradiation (kw.h/m$^3$), which indicates the results of tests in which trichloroethylene was decomposed by UV+H$_2$O$_2$ precess (based on the invention). That is, when the quantity of UV irradiation is 0.18 kw.h/m$^3$, the trichloroethylene concentration in the treated water becomes 0.5 mg/l. As the quantity of UV irradiation increases to 0.37, 0.77, 1.35 and 2.03 kw.h/m$^3$, the trichloroethylene concentration decreases to 0.04, 0.01, 0.004 and 0.003 mg/l. From the results described above, it can be noticed that the treatment method based on the invention is effective when the quantity of UV irradiation is approx. 0.4 kw.h/m$^3$ or above. FIG. 3 shows the results of the tests conducted with an initial trichloroethylene of 0.05 mg/l. From the results showing that the trichloroethylene concentration after being treated by UV irradiation of 0.2 kw.h/m$^3$ or above was 0.03 mg/l or less, it is clear that the invention is effective. Especially, when the water was treated by UV irradiation of 0.77 kw.h/m$^3$ or above, the trichloroethylene concentration fell down to below 0.001 mg/l.

For the application examples mentioned above, explanations were given only to the cases where the initial trichloroethylene concentrations was 5.0 mg/l and 0.05 mg/l. However, even if the initial trichloroethylene concentration was 5.0 mg/l or above or 0.05 mg/l or below, the trichloroethylene concentration in the treated water could be easily reduced to the target value of 0.03 mg/l or less.

Furthermore, as organic chlorine compounds contained in raw water, besides trichloroethylene, there are tetrachloroethylene and 1,1,1-trichloroethane, and the pollution of ground water by the compounds is becoming a serious problem. Therefore, decomposition tests were conducted using the water containing 1.0–100 mg/l of tetrachloroethylene and 1.0–100 mg/l of 1,1,1-trichloroethane as raw water, in the same manner and under the same conditions as in the above mentioned case of trichloroethylene. From the test results, it was confirmed that the concentrations of the compound(tetrachloroethylene and 1,1,1-trichloroethane) in the treated water could be reduced down to 0.01 mg/l and 0.3 mg/l respectively. The target values of the concentrations of tetrachloroethylene and 1,1,1-trichloroethane in the treated water were set at the provisional standard values of city water (established by the Ministry of Health and Welfare of Japan on Feb. 18, 1984.).

Furthermore, the effectiveness of both the pH adjusting process in the 3rd process and the temperature adjusting process in the 4th process is described below.

Figure 4:
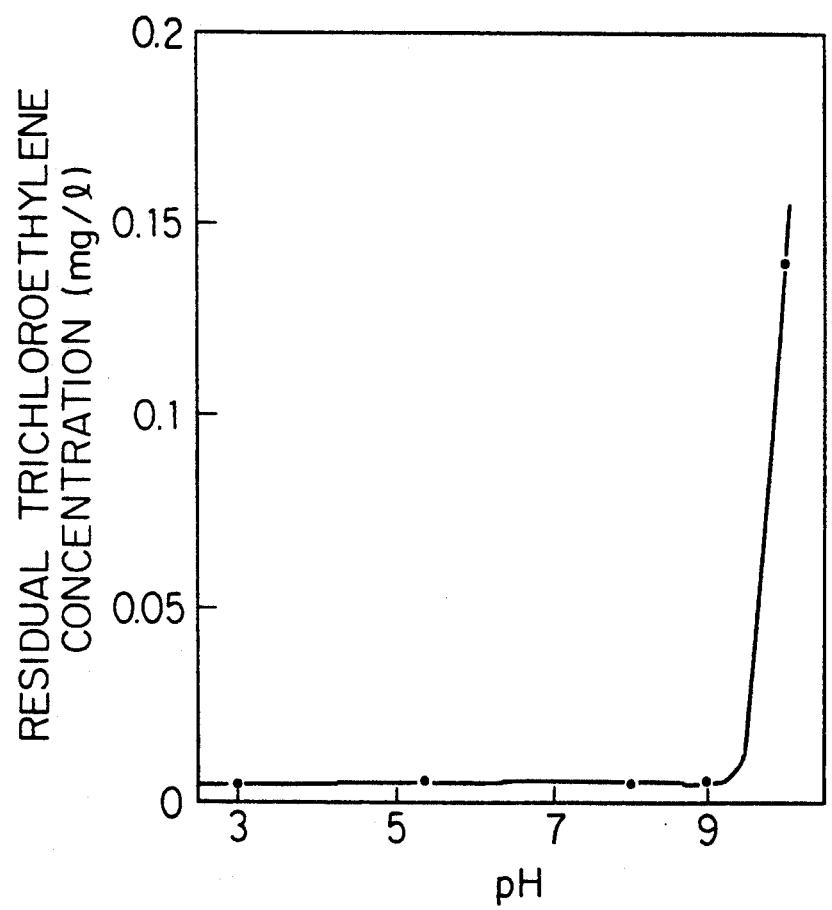
FIG. 4 indicates relation between pH and residual trichloroethylene concentration for the same amount of ultraviolet rays irradiation.

In tank 4 containing the water with 10 mg/l of trichloroethylene, pH of the water was adjusted to 3, 5.3, 8, 9, 10 by adding sodium hydroxide and sulfuric acid from sodium hydroxide storage tank 13 and sulfuric acid storage tank 16 respectively to tank 4. The chemicals were added to the solution in tank 4 so that the hydrogen peroxide concentration became 250 mg/l. Then, oxidation decomposition was carried out by means of UV-oxidation-decomposition unit 7. FIG. 4 shows the measurement results of the residual trichloroethylene concentration in case where the quantity of UV irradiation was 0.77 kw.h/m$^3$. When pH of the water was 3, 5.3, 8, 9, the residual trichloroethylene concentration in the treated water became 0.003, 0.005, 0.004, 0.006 mg/l respectively. On the other hand, when pH was 10, the residual trichloroethylene concentration became 0.14 mg/l, which proves the effectiveness of the invention.

Figure 5:
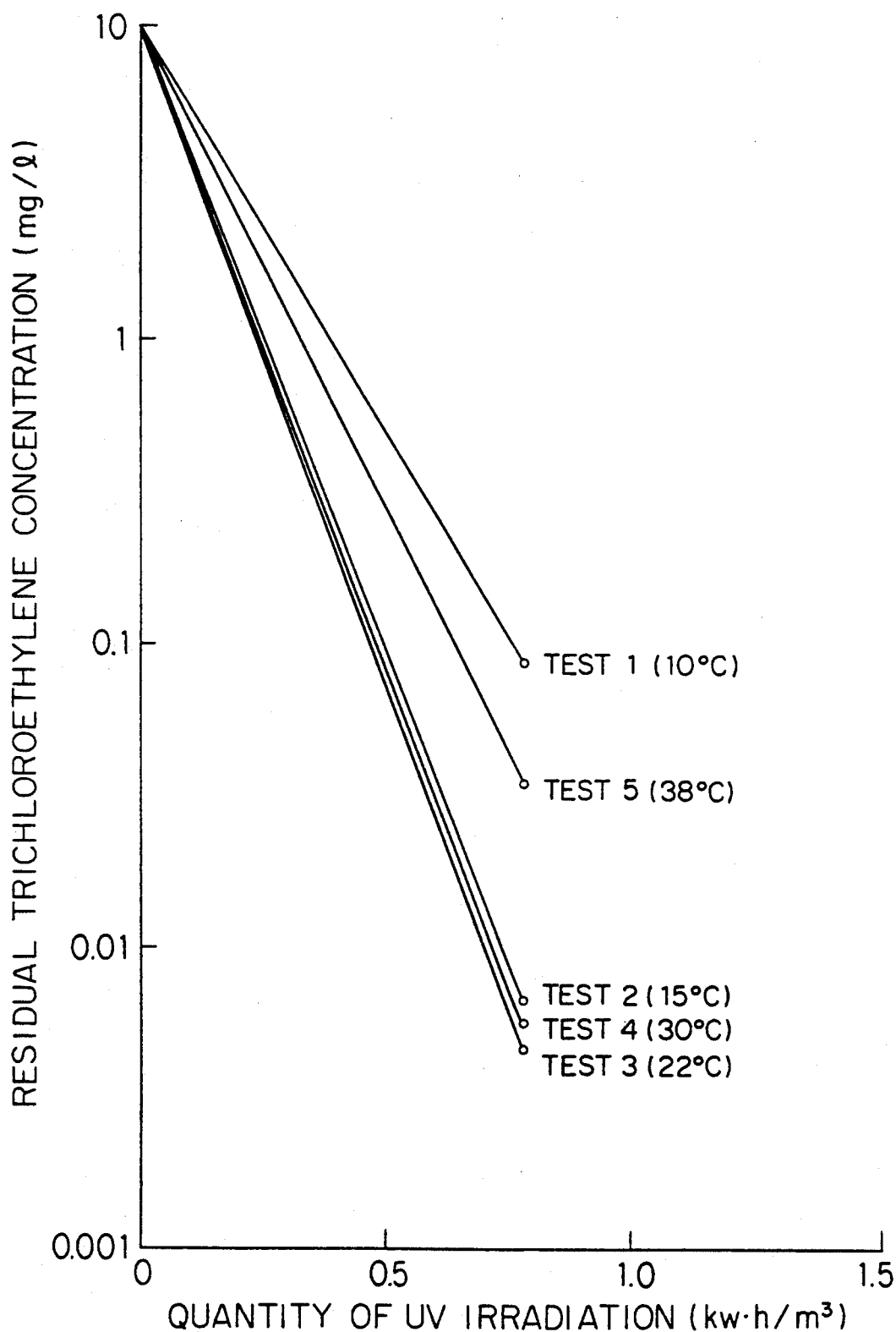
FIG. 5 indicates relation between trichloroethylene concentration and ultraviolet rays irradiation amount for various raw water temperatures.

In addition, different tests were conducted with trichloroethylene concentration adjusted to 10 mg/l and hydrogen peroxide concentration to 220 mg/l respectively in tank 4. As test 1, the water in tank 4 was passed through flowmeter 6 (at a flowrate of 0.6 l/min) and heat exchanger 15 to adjust the water temperature to 10° C., and then directed to UV-oxidation-decomposition unit 7. Other tests were also carried out with the water temperature at the heat exchanger outlet adjusted to 15°, 22°, 30° and 38° C. as tests 2, 3, 4 and 5. As shown in FIG. 5, when the quantity of UV irradiation was 0.77 kw.h/m$^3$, the residual trichloroethylene concentration in the treated water became 0.09 mg/l in test 1, 0.007 mg/l in test 2(water temperature: 15° C.), 0.005 mg/l in test 3(water temperature: 22° C.), 0.006 mg/l in test 4(water temperature: 30° C.), 0.03 mg/l in test 5(water temperature: 38° C.). From the test results, it is clear that the water temperature between 15° to 30° C. is effective in the oxidation decomposition.

In the application examples mentioned above, the tests were performed with an initial trichloroethylene concentration set at 10 mg/l in tank 4. However, it has been confirmed that the oxidation decomposition under the above mentioned conditions can be efficiently carried out at either higher and lower concentrations. Needless to say, if pH of the water is 9 or below and the temperature of the water is within a range of 15° to 30° C. in tank 4, the pH adjusting unit in the 3rd process and the temperature adjusting unit in the 4th process may be naturally omitted.

In the treatment method based on the invention, in which the disinfection of bacteria and the decomposition of organic chlorine compounds occur by irradiating ultraviolet rays on the polluted water after the addition of oxidizing agent to the water, polluted water can be effectively and economically treated because only the reduction treatment of oxidizing agent is required as the after-treatment of the treated water. In addition, since bacteria can be disinfected by the addition of oxidizing agent, clogging of piping, heat exchangers, etc. can be prevented only by installing the suspended material removing process such as filtration and sedimentation, which enables the system to treat and makes an effective use of a large amount of polluted water including ground water.

Further, it is important for effective oxidation decomposition to adjust pH of the water to 9 or below—preferably between 3 to 9, and to adjust the temperature of the water within a range of 15° to 30° C. at the inlet of the UV-oxidation-decomposition unit.

What is claim is:

1. A method for the recovery of water from a raw water containing an organic chlorine compounds, bacteria and suspended solids comprising:
   adding oxidizing agent into said raw water in an excess amount necessary to disinfect said bacteria contained in the raw water, said oxidizing agent being selected from the group consisting of hydrogen peroxide and ozone,
   removing the suspended solids contained in the oxidizing agent containing raw water,
   adjusting the raw water, that is free of suspended solids, so that pH of the raw water is 9 or below and temperature of the raw water is between 15° and 30° C.,
   irradiating ultraviolet rays onto the oxidizing agent remaining in the pH and temperature adjusted raw water so that the organic chlorine compounds in the raw water are decomposed, and
   reducing residual oxidizing agent remaining in the water after said irradiating step so that the raw water contaminated by the organic chlorine compounds are effectively removed.

2. The method according to claim 1, in which the organic chlorine compounds in the raw water are oxidation-decomposed by active oxygen generated from residual oxidizing agent added to disinfect bacteria and remaining in the raw water.

3. The method according to claim 2, wherein the active oxygen is generated by irradiating ultraviolet rays onto the oxidizing agent.

4. The method according to claim 1, in which the ultraviolet rays are irradiated by low pressure mercury lamps with a wave length of 253.7 nm.

5. The method according to claim 1, wherein the oxidizing agent is hydrogen peroxide.

6. The method according to claim 1, further comprising adjusting pH of the raw water by adding an alkali agent after said irradiating step and before reducing the residual oxidizing agent.

* * * * *